United States Patent Office 3,666,407
Patented May 30, 1972

3,666,407
PROCESS FOR PRODUCING SYNTHETIC
HECTORITE-TYPE CLAYS
Justus K. Orlemann, Easton, Pa., assignor to
Pfizer Inc., New York, N.Y.
No Drawing. Filed Jan. 28, 1971, Ser. No. 110,751
Int. Cl. C01b 33/28
U.S. Cl. 23—111
4 Claims

ABSTRACT OF THE DISCLOSURE

Synthetic hectorite-type clay materials are prepared by calcining a mixture of $Li_2CO_3$ and talc, mixing with an aqueous solution of a sodium silicate and $Na_2CO_3$, and hydrothermally treating the resulting mixture. Subsequent drying is optionally provided.

BACKGROUND OF THE INVENTION

Most clay minerals, as found naturally, are in an impure state and the complete purification of some is difficult and expensive and, in some cases, impossible. Further, there are occasions on which the supply of a clay mineral of a particular chemical composition, either pure or impure, is insufficient. Thus, it is desirable to be able to manufacture synthetic clay-like minerals in a substantially pure form.

It is of particular interest to be able to manufacture synthetic clay-like minerals having rheological properties similar to or better than those of hectorite, as natural hectorite has valuable properties but large quantities of hectorite are not available. In any event natural hectorite is mixed with impurities the removal of some at least of which is extremely difficult. The naturally occurring clay, hectorite, may be represented by the formula, $$[Si_8Mg_{5.34}Li_{0.66}(OH)_4O_{20}] \cdot _{0.66}$$ 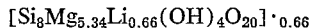

wherein F may replace some of the OH substitutent.

Two methods are known for synthesizing hectorite-type clay minerals. One is described in Granquist and Pollack, "Clays and Clay Minerals," Natl. Acad. Sci., Natl. Res. Council Publ. 8, pp. 150–69 (1960). The other is described by Strese and Hofmann in Z. Anorg. Chem., 247, pp. 65–95 (1941). However, it is not entirely possible, by either of these methods, to obtain products that are entirely pure or have good rheological properties. Furthermore, these methods and others typically involve time consuming precipitation or solubilizing procedures for the various reactants used, as well as costly recovery and drying treatments to obtain the desired product.

On the other hand, the process herein disclosed utilizes a relatively cheap and readily available source of reactant material, talc, and requires a less complicated and time-consuming series of process steps to obtain the desired product, which is ready for use directly after autoclaving—not requiring but optionally providing subsequent drying.

SUMMARY OF THE INVENTION

The present invention relates to a process for the preparation of a synthetic hectorite-type clay material comprising:

(a) calcining a mixture containing 336 parts by weight of talc and up to about 45 parts by weight of $Li_2CO_3$ at a temperature about 1400–1800° F.;

(b) mixing the calcined product of (a) with an aqueous solution containing about 38–157.6 parts by weight of a sodium silicate and about 60–120 parts by weight of $Na_2CO_3$, said sodium silicate comprising a viscous aqueous mixture containing 28.6 weight percent $SiO_2$ and 8.6 weight percent $Na_2O$; and (c) hydrothermally treating the resulting mixture of (b) for about 8–16 hours, whereby said synthetic clay material is obtained.

It is optionally provided that the resulting clay material of (c) is dried.

It is preferred that the mixture of (a) contain 6–45 parts by weight of $Li_2CO_3$ which is calcined at about 1400–1600° F., and in (b) the aqueous solution contains 75–112.5 parts by weight of the above-identified silicate. Also preferred is where the resulting mixture of (b) is a viscous slurry comprising about 37–46% by weight of solids, the weight percent of solids being calculated on a dry-weight, synthetic clay material basis free of soluble salts.

DETAILED DESCRIPTION OF THE INVENTION

It has been surprisingly found that the relatively abundant, cheap, highly insoluble and unreactive mineral, talc (having the formula $Si_8Mg_6O_{20}(OH)_4$ excluding minor impurities), can be structurally modified to yield synthetic hectorite-type clay materials having valuable oil-thickening properties. This oil-thickening property is valuable in applications such as drilling muds, greases, suspending agents, and oil-base paints.

According to the invention, in step (a) a mixture of talc—taking 336 parts by weight of the talc as a basis for determining the relative weights of the other ingredients—and up to about 45 parts by weight of $Li_2CO_3$ are calcined at 1400–1800° F. This has the effect of breaking down the chemical structure of the talc for subsequent reaction to eventually yield the synthetic clay material desired.

It is preferred to calcine at a temperature of 1400–1600° F. for about ½ to 1 hour, which is found to be optimum. Higher temperatures leading to increased costs with possible saving in time, and lower temperatures yielding longer times and incompletely decomposed talc.

Although talc can probably be decomposed by calcining it alone under more extreme conditions of temperature and time, it has been found according to the present process that talc can be decomposed more easily and economically by blending $Li_2CO_3$ into the talc before calcining. It is preferred to use about 6–45 parts by weight of $Li_2CO_3$. Since $Li_2CO_3$ is relatively expensive, using more than 45 parts by weight is costly and unnecessary to provide the lithium in the desired clay product and accelerate the decomposition of the talc.

An important reason for using a naturally occurring magnesium silicate such as talc (or sepiolite, or serpentine) is that it is a low cost source of Mg and Si as compared to manufactured magnesium sulphate and sodium silicate. In addition with our process there is good potential for recovery of excess alkali values and no need to dispose of a dilute solution of sodium sulphate by-product.

Talc is preferred since it is available at relatively low cost and high purity. However, composition will vary according to the locality in which the talc is mined. For example, Montana talcs approximate the theoretical composition (31.7% MgO, 63.5% $SiO_2$ and 4.8% $H_2O$), while Cafilifornia talcs often contain calcite, dolomite and tremolite. It is preferred that high purity talc be used or at least that useless, potentially deritmental impurities be removed.

In step (b) the calcined product of (a) is mixed with an aqueous solution containing about 38–157.6 parts by weight of the previously identified silicate and about 60–120 parts by weight of $Na_2CO_3$. It is preferred that the resulting viscous slurry obtained in (b) contain about 37–46% by weight of solids (corresponding to a talc particle size of 20 microns or less, and 44 microns or less, respectively), in which such solids weight percent is calculated on a dry-weight, synthetic hectorite-type clay material basis free of soluble salts (i.e. based on the theoretical amount of synthetic hectorite-type clay product that would be obtained from the starting materials, free of impurities).

The preferred amount of the silicate used in (b) is about 75–112.5 parts by weight, which corresponds to the commercial form used herein, namely N sodium silicate (containing 28.6% $SiO_2$ and 8.6% $Na_2O$ by weight in a viscous aqueous fluid). Other commercial forms of sodium silicate can be used (e.g. $Na_2SiO_3$, $Na_4SiO_4$, $Na_2SiO_3 \cdot 9H_2O$, etc.), the amount of which anyone skilled in the art could determine. Of course, the amount of silica used depends on the silica content of the talc used. For the talcs approximating the theoretical composition already given, the preferred range given above yields synthetic clay materials having excellent oil-thickening properties.

$Na_2CO_3$ is used to provide alkalinity and part of the Na atoms necessary in the desired clay product. Use of a stronger alkali such as NaOH is less desirable because it tends to prevent the entry of silica into the clay structure due to its solvent action on the silica, resulting in the need for more silicate. $NaHCO_3$ may also possibly be used. As to the amount of $Na_2CO_3$ used in (b), it is preferred to use 60–120 parts by weight. Using less than 60 parts by weight results in less desirable oil-thickening properties in the final product, and longer autoclaving times in step (c). Using more than 120 parts by weight results in some improvement in the final clay product, but does not necessarily further reduce the autoclaving time in step (c). It should be noted that $Na_2CO_3$ is preferably added in (b) after calcining in (a) since the use of $Na_2CO_3$ rather than $Li_2CO_3$ in (a) results in a sintered mass which sticks to the calcining equipment and is difficult to process further. Also, the mixture of (b) is preferably a viscous concentrated slurry which results in lower heating requirements in (c) and higher production rates for a given size autoclave.

In step (c) the viscous slurry mixture of (b) is hydrothermally treated for about 8–16 hours in a steam operated autoclave. The steam temperature is typically about 366° F. at a corresponding pressure of 150 p.s.i.g. Less autoclaving time would probably be achieved by increasing the steam temperature and pressure (e.g. 406° F. and 250 p.s.i.g.); however, this would also lead to increased heating and equipment costs. Other temperature-pressure conditions in the autoclave can be chosen by anyone skilled in the art.

The synthetic hectorite-type clay material obtained from (c) is in the form of cake which can be broken up into small pieces, cooled, and stored until ready to be used. Optionally, the clay material can be dried (e.g. at 228° F.) prior to adducting to further improve its oil-thickening properties.

The effectiveness of the clay-like materials prepared by the process disclosed herein as oil-thickeners are evaluated in terms of their ability to form a grease-like material when dispersed in a lubricating oil. Before dispersing in the oil, the clay-like materials are adducted with about 0.9 to 1.1 milliequivalents of Arquad 2HT (essentially dimethyldioctadecyl ammonium chloride) per gram of clay-like material.

The ability of the adduct (clay-like material+Arquad 2HT) to thicken a lubricating oil is determined by means of a standard lubricating grease penetration test (similar to test in ASTM Designation D–217–68) which follows. Note that a lubricating grease would contain components additional to those tested herein whose functions are primarily for retarding oxidation of the oil and corrosion of bearings.

Cone penetration of lubricating grease

Penetration of lubricating grease is the depth in tenths of a millimeter that a standard cone penetrates the sample at 77° F.

Penetrometer.—Used in the application of the cone to the surface of the sample and for measuring the penetration at the conclusion of the test. Constructed so that by means of a slow motion adjustment the tip of the cone adjoins the level surface of the sample while maintaining a zero reading on the indicator. The cone falls when released without appreciable friction.

Cone.—Consisting of a conical body of brass or corrosion resistant steel with detachable hardened steel tip. The total weight of the cone and its movable attachments shall be 150 g. plus or minus 0.10 g.

Grease worker.—The worker may be constructed for either manual or mechanical operation provided a rate of 60 plus or minus 10 strokes per minute can be maintained.

Spatula.—Of corrosion-resistant steel, having a stiff blade 1.25" in width and at least 6" in length with its end cut on the square.

Procedure

With the sample at 77° F. plus or minus 1° F., place into worker until overflowing at least one pound of the desired sample. The inclusion of air is avoided by packing with a spatula. For a worked penetration, place the plunger on the worker and in about one minute complete 60 full double strokes or cycles (one stroke in and one stroke out). The grease worker can be used at a rate of 60±10 strokes per minute. Prepare the sample in the worker for testing so that a uniform and reproducible structure of grease will be obtained. Scrape off the excess grease extending over the rim of the worker by moving the blade of the spatula, held inclined toward the direction of motion at an angle of 45°, across the rim of the worker, retaining the portion removed.

Place the cup on the penetrometer table making sure it cannot teeter during the test. Observe that the cone is in its "zero" position, and lower as a unit the cone and indicator assembly until the cone tip nearly touches the surface of the grease at a point near the center of the container. Lock the cone and indicator assembly in position and bring the tip of the cone down to just touch the surface of the grease by means of the slow motion adjustment and with the aid of the shadow obtained in the mirror assembly. Press the release lever allowing the cone shaft to penetrate into the sample for the required five seconds. Gently depress the indicator shaft until it is stopped by the cone shaft and read the penetration from the indicator scale.

Repeat the last procedure for the remaining two tests that are required, making sure that the cone has been wiped clean and smoothing the surface of the grease each time. The *average of the three* tests is the penetration of the sample.

This test is used to measure the efficiency of our samples in thickening lubricating oils. Thus, if equal weight percent of the adducts in the oil produce the same penetration values the adducts are considered equally efficient. A smaller penetration number indicates the particular adduct is more efficient in oil thickening. Also tested is the ability of the adduct to maintain efficiency by use of a prolonged worked penetration test (in our case 5,000 cycles, arbitrarily chosen). This would be related, say, to a lubricating grease, in an operating bearing, being subjected to prolonged working and becoming so thin or fluid that it could flow out of the bearing.

The CB (comeback) penetration value may be established, but, is not ordinarily reported in the trade. Its function is an additional characterization of the adduct used and indicates the ability of the adduct to reform its structure in the oil after working of 5000 cycles and after the sample is given a period of rest. It helps indicate the direction to take when clay processing variables are being changed.

The following examples are provided for illustrative purposes and should not be interpreted as limiting the invention, the scope of which is defined by the appended claims.

The subject process is based upon an ideal formula for hectorite as follows:

$$(Si_8Mg_{5.34}Li_{.66}(OH)_4O_{20})Na_{.66}$$

where $F^-$ can substitute for $OH^-$.

In the following examples the formulas are calculated from the ratios of ingredients in the mixture placed in the autoclave and do not necessarily apply to the respective products.

$Li_2CO_3$, percent excess=

$$\left(\frac{\text{wt. } Li_2CO_3 \text{ in mix} \times 100}{\text{wt. } Li_2CO_3 \text{ required by the calculated formula}}\right) - 100$$

Note that the formulas have Na written in the external, exchange positions since it is believed that there is sufficient Na present to prevent excess Li from assuming this role.

Parts by weight are in terms of grams unless expressed otherwise.

EXAMPLE I 336 parts of talc powder (having a particle size in which 98% by weight of the talc is less than 44 microns) are blended with 25.2 parts of lithium carbonate powder and this is then calcined 1 hour in a laboratory muffle furnace. The calcine is then mixed with a water solution containing 300 parts of water, 60 parts of $Na_2CO_3$, and 75 parts of N sodium silicate (aqueous solution having 28.6% weight $SiO_2$ and 8.6% weight $Na_2O$) so as to produce a viscous mixture of high solids content, around 46% on the hectorite salt-free product basis. This mixture is placed in a pan and subjected to elevated temperature, about 366° F., at the corresponding gauge pressure, about 150 p.s.i., in a steam operated, horizontal autoclave for a period of time, conveniently overnight, about 8–16 hours. After depressurizing and opening the autoclave, the product pan is removed and the cake of clay-like product having a calculated formula of $$(Si_8Mg_{5.3}Li_{5.7}(OH)_4O_{20})Na_{.7}$$

containing 100% excess $Li_2CO_3$ is removed therefrom, broken up into small pieces, cooled and stored in a closed container.

Portions of this material are then adducted with a specific level, milliequivalents per gram of Arquad 2HT (essentially dimethyldioctadecyl ammonium chloride) and the washed, dried, ground adducts are tested for their ability to form a grease-like material when dispersed in lubricating oil. The hardness of this grease is determined by means of the standard penetration test previously described. Therefore, a smaller penetration number indicates that the adduct is more efficient in thickening the oil. Penetration values listed in Table 1 below are taken after the grease had been "worked," in a standard apparatus for 60 and 5000 cycles. The CB (comeback) penetration value is a measure of the ability of the adduct to restructure in the grease after a period of rest.

TABLE 1

| Calcination temp., ° F. | Adduct level, me./g. | Adduct in oil, percent | Penetration values | | |
|---|---|---|---|---|---|
| | | | 60 cycles | 5,000 cycles | CB |
| 1,600 | 1.0 | 10 | 306 | >380 | 316 |
| 1,550 | 1.0 | 10 | 325 | >380 | 320 |
| 1,525 | 1.0 | 10 | 240 | 321 | 243 |
| 1,500 | 1.0 | 10 | 254 | 287 | 248 |
| 1,475 | 1.0 | 10 | 230 | 290 | 258 |
| 1,400 | 1.0 | 10 | 364 | >380 | >380 |

EXAMPLE II

The procedure of Example I is followed except that the calcination temperature is constant at 1500° F. and the parts of N silicate used are varied as shown below in Table 2. Also shown are the clay-like product calculated formulas and $Li_2CO_3$ weight percent excess in the product.

TABLE 2

| Silicate, parts | Adduct level, me./g. | Adduct in oil, percent | Penetration values | | | Formula (calculated) | $Li_2CO_3$, percent excess |
|---|---|---|---|---|---|---|---|
| | | | 60 cycles | 5,000 cycles | CB | | |
| 38 | 1.0 | 10 | 351 | >380 | 371 | $(Si_8Mg_{5.6}Li_{.4}(OH)_4O_{20})Na_{.4}$ | 269 |
| 75 | 1.0 | 10 | 254 | 287 | 248 | $(Si_8Mg_{5.3}Li_{.7}(OH)_4O_{20})Na_{.7}$ | 100 |
| 112.5 | 1.0 | 6 | 251 | 285 | 253 | $(Si_8Mg_{5.1}Li_{.9}(OH)_4O_{20})Na_{.9}$ | 50 |
| 126 | 1.0 | 6 | 250 | 301 | 263 | $(Si_8Mg_{5.0}Li_{1.0}(OH)_4O_{20})Na_{1.0}$ | 33 |
| 157.6 | 1.0 | 6 | 282 | 375 | 318 | $(Si_8Mg_{4.84}Li_{1.16}(OH)_4O_{20})Na_{1.16}$ | 10 |

EXAMPLE III

The procedure of Example II is followed except an equivalent amount of NaOH is used, namely 45 parts, in place of $Na_2CO_3$. The results are shown in Table 3 below.

TABLE 3

| Silicate, parts | Adduct level, me./g. | Adduct in oil, percent | Penetration values | | |
|---|---|---|---|---|---|
| | | | 60 cycles | 5,000 cycles | CB |
| 75 | 1.0 | 10 | 346 | 377 | 255 |
| 112.5 | 1.0 | 10 | 255 | 280 | 223 |

EXAMPLE IV

The procedure of Example I is followed except that the calcination temperature is constant at 1500° F. (except as indicated below), either 45 parts of NaOH or 60 parts of $Na_2CO_3$ are used as alkali, and the parts of $Li_2CO_3$ are varied as shown below in Table 4. Also shown are the clay-like product calculated formulas and $Li_2CO_3$ weight percent excess in the product.

TABLE 4

| $Li_2CO_3$, parts | Alkali | Adduct level, me./g. | Adduct in oil, percent | Penetration values | | | Formula (calculated) | $Li_2CO_3$, percent excess |
|---|---|---|---|---|---|---|---|---|
| | | | | 60 cycles | 5,000 cycles | CB | | |
| 25.2 | NaOH | 1.0 | 10 | 346 | 377 | 255 | $(Si_8Mg_{5.3}Li_{.7}(OH)_4O_{20})Na_{.7}$ | 100 |
| 12.6 | NaOH | 1.0 | 10 | 316 | >380 | 346 | $(Si_8Mg_{5.3}Li_{.7}(OH)_4O_{20})Na_{.7}$ | 0 |
| 25.2 | $Na_2CO_3$ | 1.0 | 10 | 254 | 287 | 248 | $(Si_8Mg_{5.3}Li_{.7}(OH)_4O_{20})Na_{.7}$ | 100 |
| 37.8 | $Na_2CO_3$ | 1.0 | 10 | 275 | 370 | 229 | $(Si_8Mg_{5.3}Li_{.7}(OH)_4O_{20})Na_{.7}$ | 200 |
| 0.0 [1] | $Na_2CO_3$ | 1.0 | 10 | 277 | 332 | 269 | $(Si_8Mg_{5.3}H_{.7}(OH)_4O_{20})Na_{.7}$ | -- |
| 0.0 [2] | $Na_2CO_3$ | 1.0 | 10 | 260 | 336 | 296 | $(Si_8Mg_{5.3}H_{.7}(OH)_4O_{20})Na_{.7}$ | -- |

[1] Talc calcined 1 hour at 1,700° F.
[2] Talc calcined 1 hour at 1,800° F.

NOTE.—Where the talc is calcined alone, 25.2 parts of $Li_2CO_3$ is stirred into the viscous mixture just prior to the autoclaving step.

EXAMPLE V

The procedure of Example I is followed except that the calcination temperature is constant at 1550° F. and the parts of $Na_2CO_3$ used are varied as shown below in Table 5.

TABLE 5

| $Na_2CO_3$, parts | Adduct level, me./g. | Adduct in oil, percent | Penetration values | | |
|---|---|---|---|---|---|
| | | | 60 cycles | 5,000 cycles | CB |
| 60 | 1.0 | 10 | 325 | >380 | 320 |
| 90 | 1.0 | 10 | 226 | 280 | 246 |

EXAMPLE VI

The procedure of Example I is followed except that the talc is blended with the lithium carbonate on a larger scale than in Example I and the blend is calcined at an indicated temperature approximately equivalent to 1500° F. in the laboratory furnace, in a rotating tube, pilot plant furnace at a rate of 20 pounds per hour. 102 pounds of the talc is blended with 7.65 pounds of the lithium carbonate (336 parts with 25.2 parts) in a conical blender.

A weight of this product equal to the weight of the equivalent laboratory calcined product is mixed with 300 parts of water and the indicated parts of $Na_2CO_3$ and N sodium silicate below and similarly processed as in Example I. The results are shown below in Table 6.

TABLE 6

| $Na_2CO_3$, parts | Silicate, parts | Adduct level, me./g. | Adduct in oil, percent | Penetration values | | | Formula (calculated) | $Li_2CO_3$, percent excess |
|---|---|---|---|---|---|---|---|---|
| | | | | 60 cycles | 5,000 cycles | CB | | |
| 90 | 75 | 1.1 | 6 | 265 | 280 | 240 | $(Si_8Mg_{5.3}Li_{.7}(OH)_4O_{20})Na_{.7}$ | 100 |
| 90 | 93 | 1.1 | 6 | 228 | 265 | 238 | $(Si_8Mg_{5.2}Li_{.8}(OH)_4O_{20})Na_{.8}$ | 73 |
| 90 | 115.6 | 1.1 | 6 | 239 | 335 | 310 | $(Si_8Mg_{5.05}Li_{.95}(OH)_4O_{20})Na_{.95}$ | 41 |
| 60 | 93 | 1.1 | 6 | 256 | 292 | 245 | $(Si_8Mg_{5.2}Li_{.8}(OH)_4O_{20})Na_{.8}$ | 73 |
| 120 | 93 | 1.1 | 6 | 235 | 262 | 239 | $(Si_8Mg_{5.2}Li_{.8}(OH)_4O_{20})Na_{.8}$ | 73 |
| 0 [1] | 115.6 | | | Not tested | | | $(Si_8Mg_{5.05}Li_{.95}(OH)_4O_{20})Na_{.3}$ | 41 |

[1] The resulting product contained enstatite, less than 50% hectorite and approximately 5% quartz.

EXAMPLE VII

The procedure of Example I is followed except that 98 weight percent of the talc particles used have a size of 20 microns or less; the calcination temperature is constant at 1500° F.; and calcined product is mixed with a water solution containing 525 parts water, 90 parts $Na_2CO_3$, and 75 parts N sodium silicate to produce a viscous mixture of high solids content, around 37% on the hectorite salt-free product basis. Test results are shown below in Table 7, where the autoclaved clay-like product is dried and not dried before adducting. Also, for comparison is shown test results for a natural hectorite adduct, Bentone 38 (made by National Lead Co.).

TABLE 7

| Material adducted | Adduct level, me./g. | Adduct in oil, percent | Penetration values | | |
|---|---|---|---|---|---|
| | | | 60 cycles | 5,000 cycles | CB |
| Non-dried, cooled autoclave product | 0.9 | 6 | 214 | 246 | 210 |
| Dried autoclave product | 0.9 | 6 | 224 | 229 | 222 |
| Bentone 38 | | 6 | 205 | 238 | 209 |

What is claimed is:

1. A process for the preparation of a synthetic hectorite-type clay material comprising:
   (a) calcining a mixture containing 336 parts by weight of talc and up to about 45 parts by weight of $Li_2CO_3$ at a temperature about 1400–1800° F.;
   (b) mixing the calcined product of (a) with an aqueous solution containing about 38–157.6 parts by weight of a sodium silicate and about 60–120 parts by weight of $Na_2CO_3$, said sodium silicate comprising a viscous aqueous mixture containing 28.6 weight percent $SiO_2$ and 8.6 weight percent $Na_2O$; and
   (c) hydrothermally treating the resulting mixture of (b) for about 8–16 hours, whereby said synthetic clay material is obtained.

2. The process of claim 1 wherein the resulting clay material of (c) is dried.

3. The process of claim 1 wherein the mixture of (a) containing 6–45 parts by weight of $Li_2CO_3$ is calcined at a temperature about 1400–1600° F., and in (b) the aqueous solution contains 75–112.5 parts by weight of said sodium silicate.

4. The process of claim 3 wherein the resulting mixture of (b) is a viscous slurry comprising about 37–46% by weight of solids, said percent by weight of solids calculated on a dry-weight, synthetic hectorite-type clay material basis free of soluble salts.

References Cited

UNITED STATES PATENTS

| 1,254,230 | 1/1918 | Jackson | 23—110 R |
| 3,586,478 | 6/1971 | Neumann | 23—113 |

FOREIGN PATENTS

| 1,155,595 | 6/1969 | Great Britain | 23—111 |

OTHER REFERENCES

Granquist et al., "Clays and Clay Minerals," Proceedings of the Eighth National Conference on Clays and Clay Minerals, 1969, pp. 150–169.

EDWARD STERN, Primary Examiner

U.S. Cl. X.R.

23—110 R, 112, 113; 106—73; 252—28

PO-1050
(5/69)

UNITED STATES PATENT OFFICE
CERTIFICATE OF CORRECTION

Patent No. 3,666,407          Dated May 30, 1972

Inventor(s) Justus K. Orlemann

It is certified that error appears in the above-identified patent and that said Letters Patent are hereby corrected as shown below:

Column 8, Example VII, in Table 7 under the column entitled "CB", line 9, change "210" to -- 212 --, line 10, change "222" to -- 229 --, line 11, change "209" to -- 200 --.

Column 2, line 64, change "Cafilifornia" to -- California --.

Column 2, line 66, change "deritmental" to -- detrimental --.

Signed and sealed this 31st day of October 1972.

(SEAL)
Attest:

EDWARD M. FLETCHER, JR.
Attesting Officer

ROBERT GOTTSCHALK
Commissioner of Patents